United States Patent
Divakaran et al.

(10) Patent No.: US 8,107,541 B2
(45) Date of Patent: Jan. 31, 2012

(54) METHOD AND SYSTEM FOR VIDEO SEGMENTATION

(75) Inventors: Ajay Divakaran, Woburn, MA (US); Feng Niu, Miami, FL (US); Naveen Goela, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1485 days.

(21) Appl. No.: 11/593,897

(22) Filed: Nov. 7, 2006

(65) Prior Publication Data

US 2008/0124042 A1    May 29, 2008

(51) Int. Cl.
*H04N 5/262* (2006.01)
(52) U.S. Cl. .................... 375/240.28; 382/224
(58) Field of Classification Search ............. 375/240.28
See application file for complete search history.

(56) References Cited

U.S. PATENT DOCUMENTS

| | | | |
|---|---|---|---|
| 6,404,925 B1 * | 6/2002 | Foote et al. | 382/224 |
| 2002/0080286 A1 | 6/2002 | Dagtas et al. | |
| 2003/0231775 A1 | 12/2003 | Wark | |

* cited by examiner

*Primary Examiner* — Christopher S Kelley
*Assistant Examiner* — Mohammed Jebari
(74) *Attorney, Agent, or Firm* — Dirk Brinkman; Gene Vinokur

(57) ABSTRACT

A method segments a video. Audio frames of the video are classified with labels. Dominant labels are assigned to successive time intervals of consecutive labels. A semantic description is constructed for sliding time windows of the successive time intervals, in which the sliding time windows overlap in time, and the semantic description for each time window is a transition matrix determined from the dominant labels of the time intervals. A marker is determined from the transition matrices, in which a frequency of occurrence of the marker is between a low frequency threshold and a high frequency threshold. Then, the video is segmented at the locations of the markers.

12 Claims, 8 Drawing Sheets

METHOD AND SYSTEM FOR VIDEO SEGMENTATION

FIELD OF THE INVENTION

This invention relates generally to segmenting videos, and more particularly to segmenting videos according to audio signals.

BACKGROUND OF THE INVENTION

Segmenting videos is an important task in many video summarization, retrieval and browsing applications. As used herein, a video includes video content containing visual information (pixels), and audio content containing audio information (acoustic signals). The video content and the audio content are synchronized. The content can be unscripted or scripted.

Unscripted content, such as content acquired from surveillance and sport events, can be segmented by identifying highlights. A highlight is any portion of the video that contains an unusual or interesting event. Because the highlights can capture the essence of the video, segments of the video containing just highlights can provide a summary of the video. For example, in a video of a sporting event, a summary can include scoring opportunities.

Scripted content, such as news and drama, is usually structured as a sequence of scenes. One can get an essence of the content by viewing representative scenes or portions thereof. Hence, table of contents (ToC) based video browsing provides a summarization of scripted content. For instance, a news video composed of a sequence of news stories can be summarized or browsed using a key-frame representation for each portion in a story. For extraction of the ToC, segmentation is often used.

Video segmentation based on the visual content is known. Typically, low-level features, such as color intensities and motion, are used. However, such segmentation can be complex and time consuming because the underlying data set (pixels) is large and complex. Accurate visual segmentation is usually genre specific and not applicable to any type of content. Correct feature selection can be critical for a successful visual segmentation.

Videos can also be segmented using the audio content. Low-level acoustic features are extracted from the audio content. The low-level features typically represent periodicity, randomness and spectral characteristics of the audio content. Correlations with known data can then determine optimal thresholds for scene segmentation.

Most audio content can be classified into small number of audio classes, e.g., speech, music, silence, applause and cheering.

FIG. 1 shows one typical prior art audio classification method 100. Audio content 101 is the input to the method 100. The audio content 101 can be part of a video 103. The audio content can be synchronized with video content 104. Audio features 111 are extracted 110 from relatively short frames 102 of the audio content 101, e.g., the frames are about ten milliseconds. The audio features 111 can have a number of different forms, e.g., modified discrete cosine transforms (MDCTs) or mel-frequency cepstral coefficients (MFCC).

As also shown in FIG. 2, the audio features 111 in each frame are classified with a label to generate a sequence of consecutive labels 121 by a classifier 200. Each label represents one of the audio classes, e.g., applause, cheering, music, speech, and silence. The classifier 200 has a set of trained classes 210, e.g., applause, cheering, music, speech, and silence. Each class is modeled by, e.g., a Gaussian mixture model (GMM). The parameters of the GMMs are determined from low-level features extracted from training data 211. The audio features 111 can be classified by determining 220 a likelihood that the GMMs of the audio features 111 in the content correspond to the GMMs for each trained class. Thus, the labels 121 can be considered time series data that represent a low-low-level temporally evolution of a semantic interpretation of the audio content.

SUMMARY OF THE INVENTION

A method segments a video. Audio frames of the video are classified with labels. Dominant labels are assigned to successive time intervals of consecutive labels.

A semantic description is constructed for sliding time windows of the successive time intervals, in which the sliding time windows overlap in time, and the semantic description for each time window is a transition matrix determined from the dominant labels of the time intervals.

A marker is determined from the transition matrices, in which a frequency of occurrence of the marker is between a low frequency threshold and a high frequency threshold. Then, the video is segmented at the locations of the markers

DETAILED DESCRIPTION OF THE PREFERRED EMBODIMENT

Figure 1:
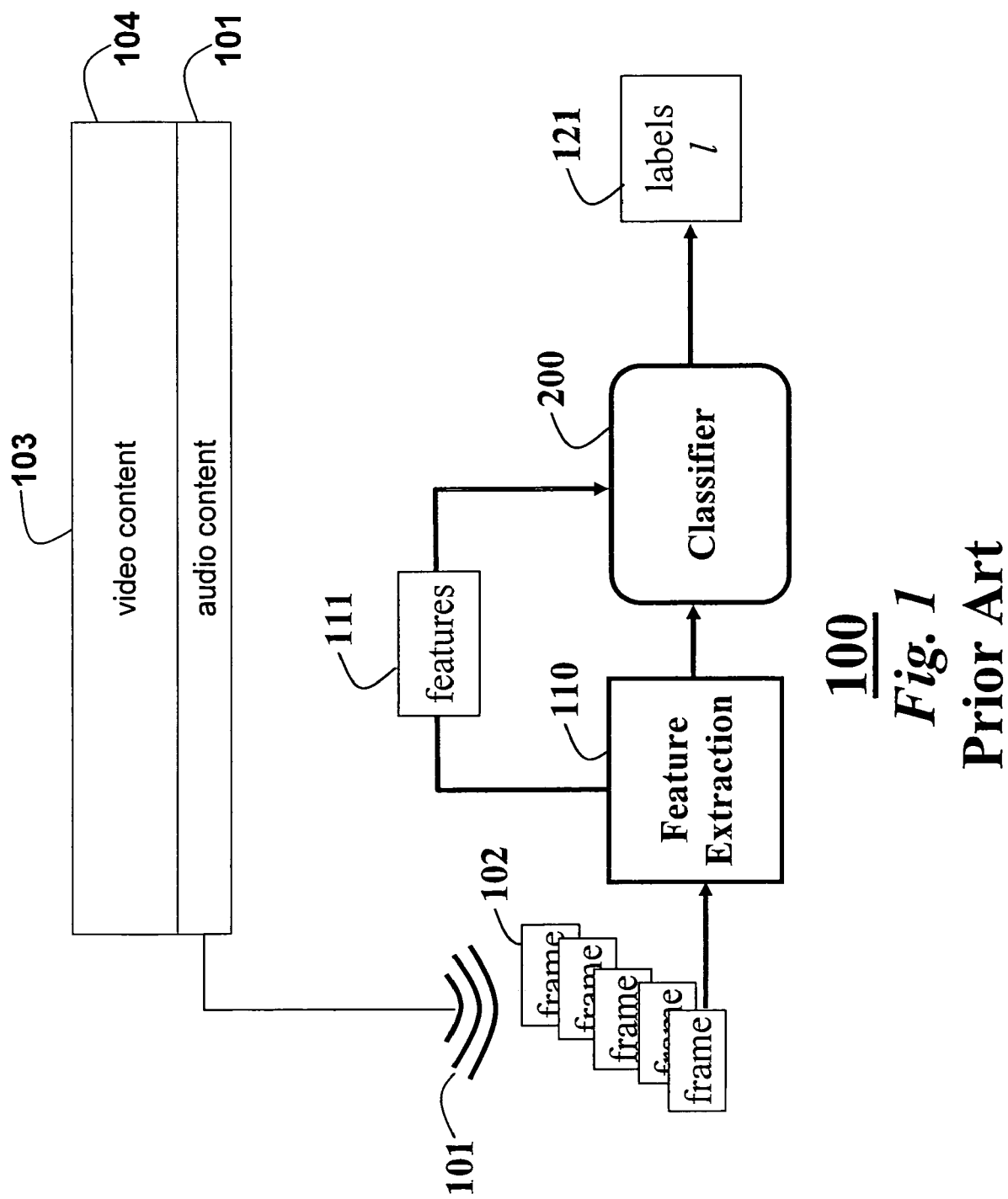
FIG. 1 is a flow diagram of a prior art audio classification method.
Figure 2:
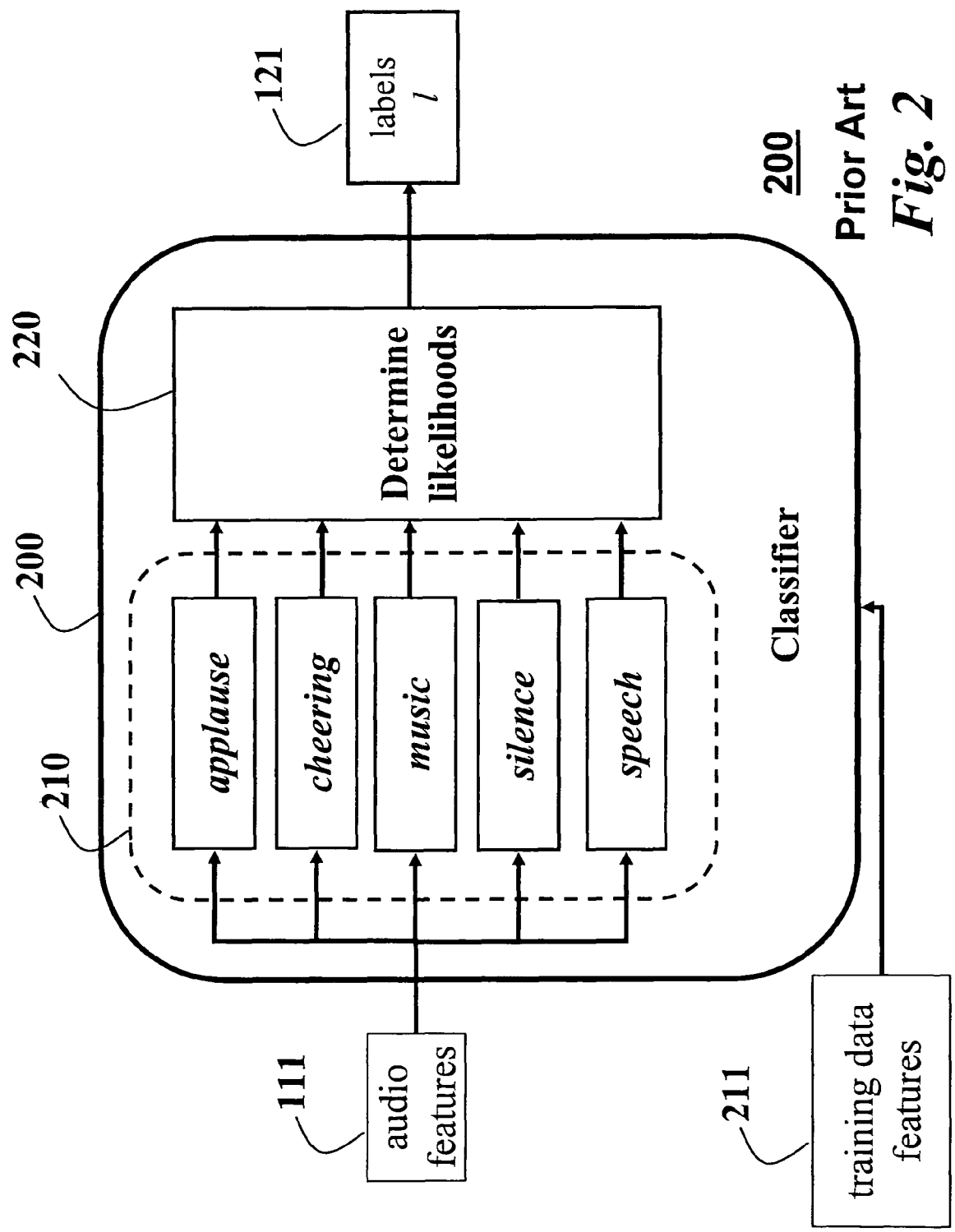
FIG. 2 is a block diagram of a prior art audio classifier.
Figure 3A:
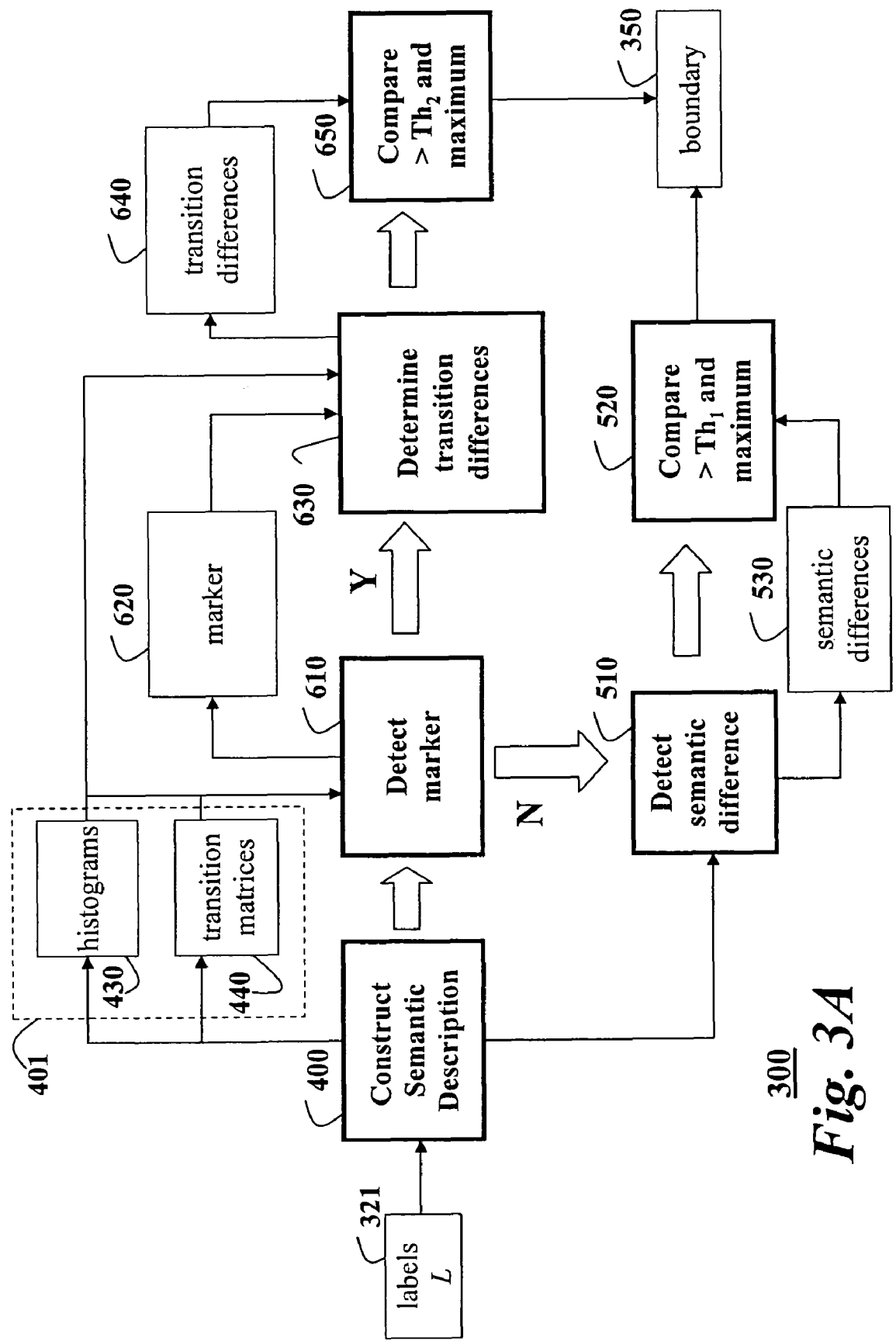
FIG. 3A is a flow diagram of an audio segmentation method according to an embodiment of the invention.
Figure 3B:
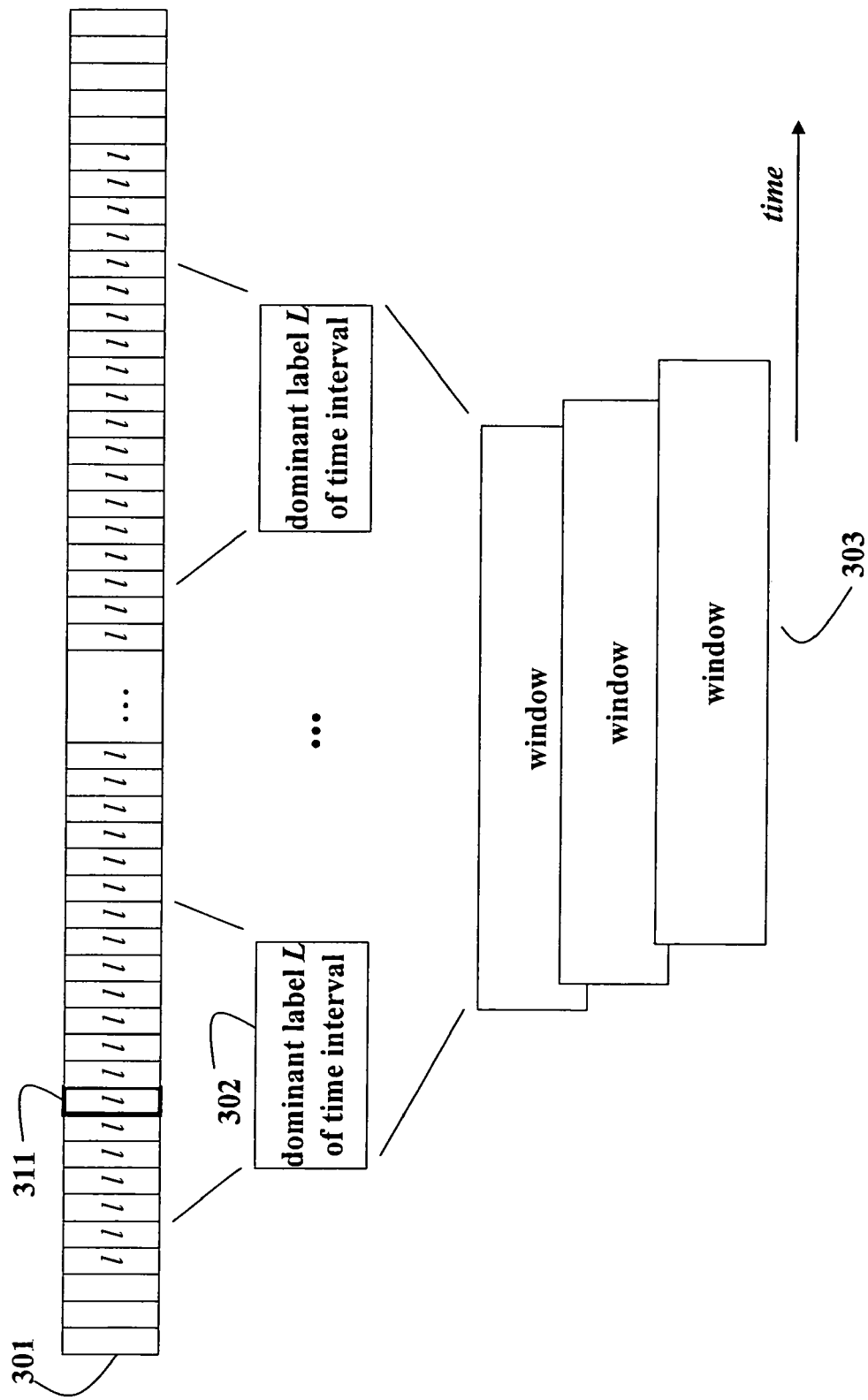
FIG. 3B is a block diagram of audio content time portions.

As shown on FIGS. 3A and 3B, embodiments of our invention provide a method 300 for segmenting video based on audio content 301. A sequence of consecutive labels l 321 of classified frame of audio content is input to the method.

We first classify the frames as described above with labels l 311. Then, we assign a dominant label L 321 to consecutive labels in time intervals 302. The time intervals are substantially longer than the frames. The dominant label is the most frequently occurring label in the consecutive frames during a one second time interval.

The dominant labels L 321 are used to construct 400 a semantic description 401 of the audio content of the video. The semantic description 401 can include transition matrices 440 and histograms 430. The semantic description can be determined for the whole audio content 301 as well as for each time-overlapping window 303, as shown on FIG. 3B. That is, each window includes the dominant labels L 321 of the consecutive intervals 302. The windows are substantially longer, e.g., thirty seconds, than the intervals, and the windows overlap each other in time, e.g., the windows move forward in time by one second. Histograms 430 can be determined from the transition matrices. The total number of labels L 321 is equal to the number of transitions, when self transitions are allowed such as: music→music.

The semantic description 401 is used to detect 610 a marker 620, e.g., music that serves to mark a scene transition in a sitcom video. Typically, the marker 620 indicates the start of a new scene or news segment. Usually, markers are present in scripted videos. Examples of scripted content are news, drama, sitcoms, how-to shows, talk shows, etc. In such shows, a scene transition often consists of a slow dissolve accompanied by a characteristic phrase of music. It is this very short piece of music that we call a special transition marker or source.

If we find a marker, then we use the marker 620 to determine 630 a transition difference 640 for the marker. We determine the transition difference 640 at every time instant $t_0$ where the marker occurs, as described below.

After determining 630 the transition difference 640, we compare 650 the transition difference 640 with a first threshold $Th_1$. If the transition difference is greater than the threshold $Th_1$ and the transition differences is also a local maximum, the corresponding time $t_0$ indicates a (segmentation) boundary 350.

If the marker 620 is not found, which is usually the case for unscripted content, we determine 510 a semantic difference 530 at every time instant $t_0$ and compare 520 the semantic difference 530 with a second threshold $Th_2$. If the semantic difference 530 is greater than the threshold $Th_2$ and the semantic difference is also a local maximum, the time $t_0$ indicated the boundary 350. In either case, the boundaries 350 can be used to segment the video.

Semantic Description

Figure 4A:
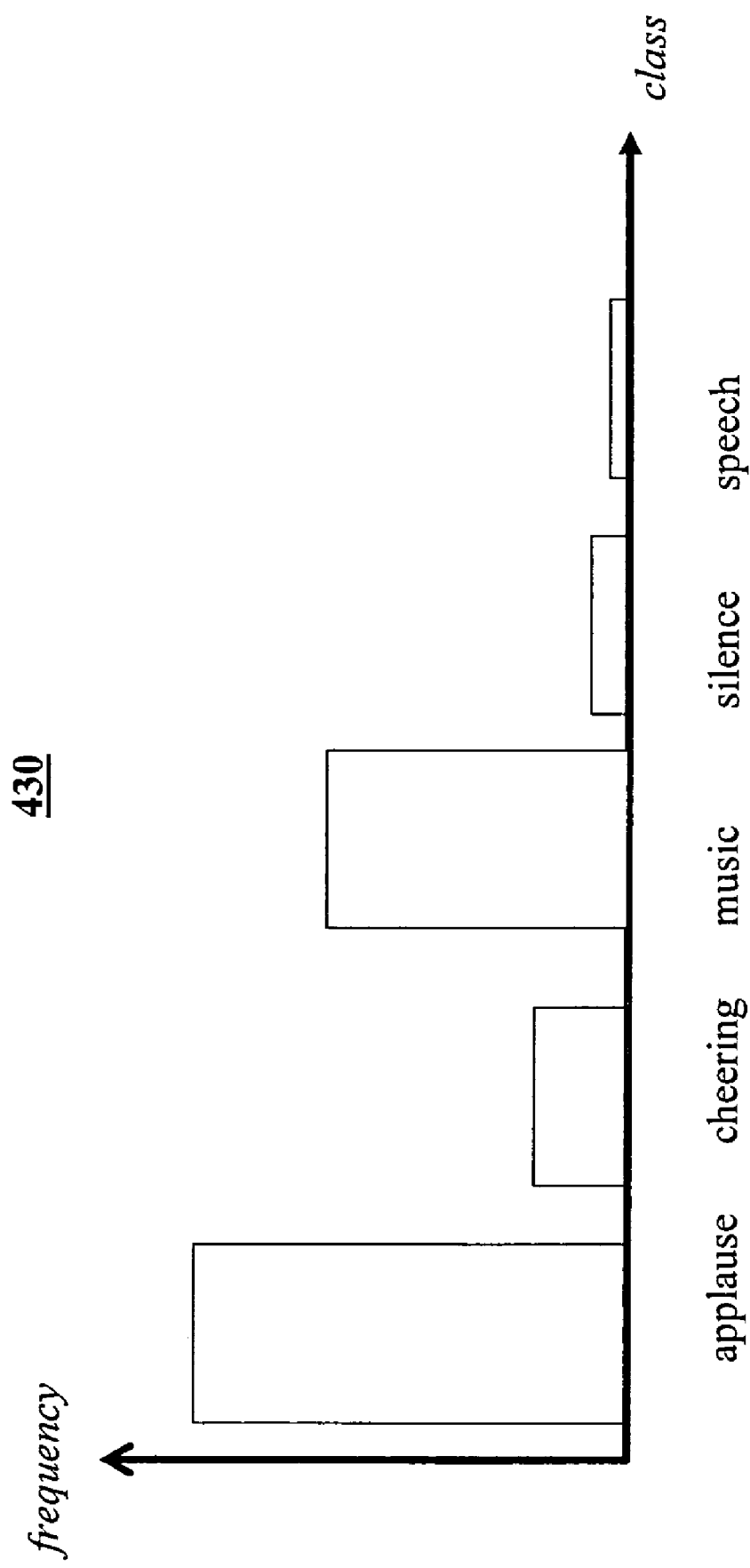
FIGS. 4A and 4B are examples of an audio semantic description according to an embodiment of the invention.
Figure 4B:
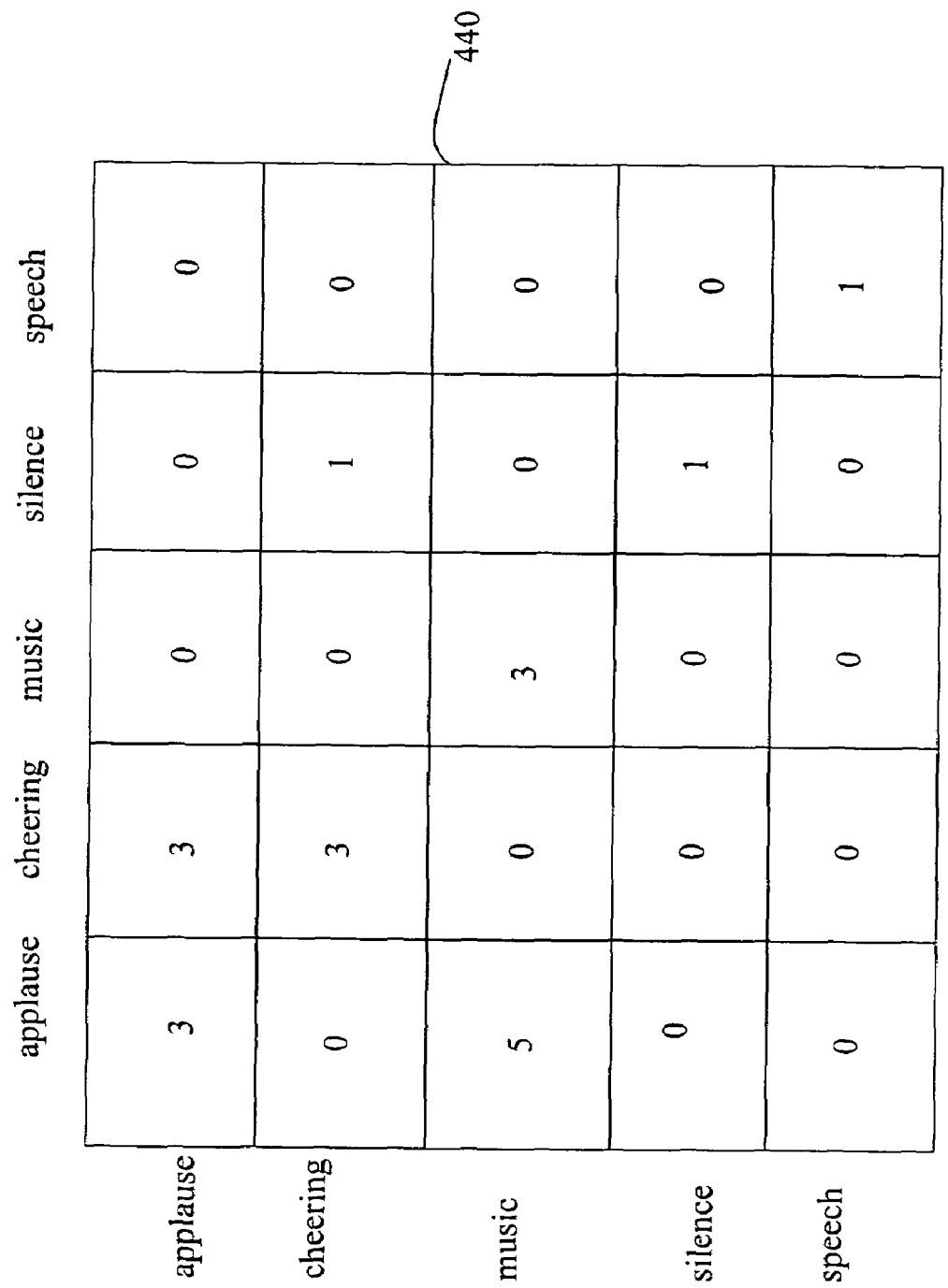

As shown on FIGS. 4A and 4B for the embodiments of our invention, we use two types of semantic descriptors. The first semantic descriptor includes histograms H(i) 430 for classes i=1, . . . , M. The second semantic descriptor is a transition matrix T(i, j) 440 from class i to class j. Self transitions (i=j) are permitted. The matrices and histograms can be determined for each time window 303, and for the entire audio content 301.

In the preferred embodiment, the values in the histograms and matrices are normalized. As stated above, the histograms H can be derived from the transition matrices T. Therefore generally in the formulations below, the symbol H can be substituted for the symbol T.

Scene Segmentation

After studying hours of video with different content such as news, drama, situation comedies, talk show, music TV, and so on, we determine that scene changes can be generalized into two types.

A first type occurs when the semantic descriptor changes substantially. For this type of content, we use the semantic difference 530 to detect scene boundaries. The second type is indicated by the marker 620.

Detecting Semantic Differences

Figure 5:
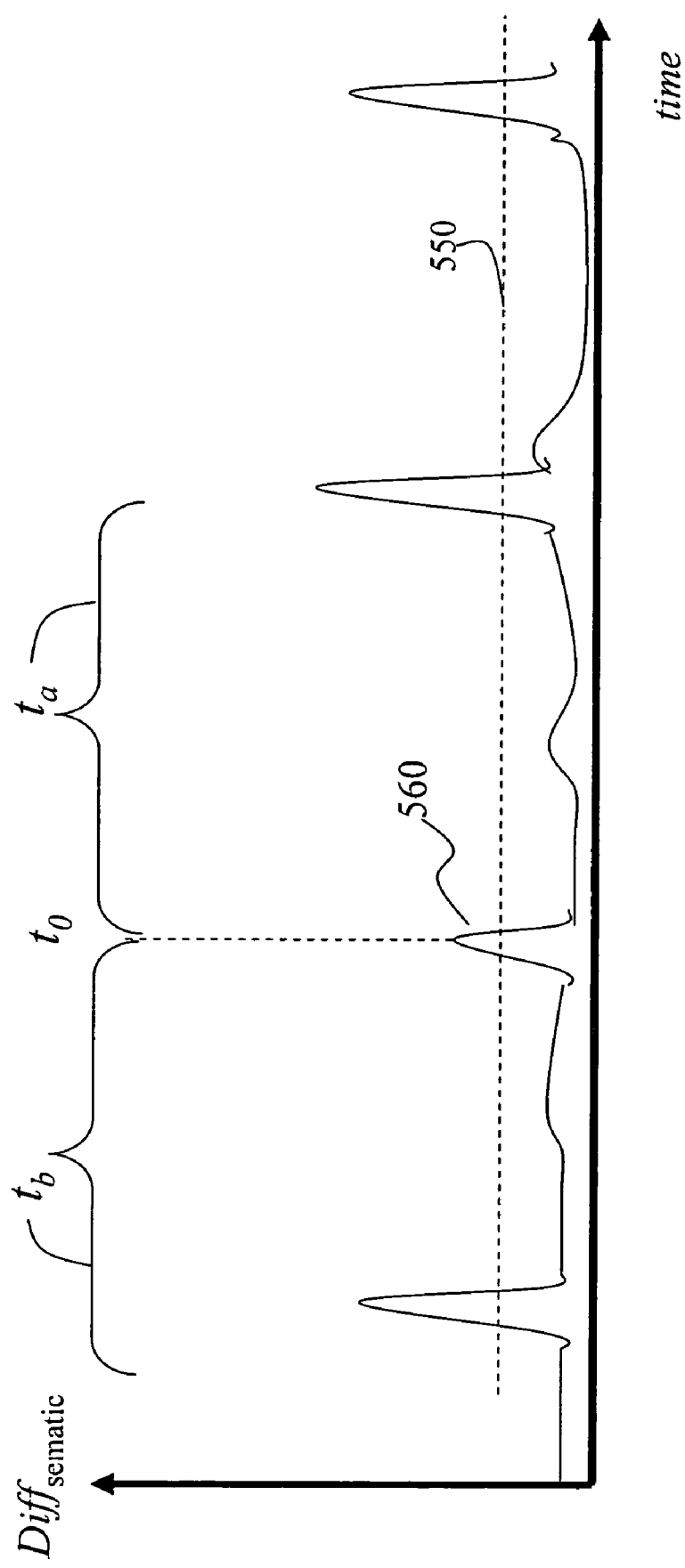
FIG. 5 is a timing diagram of unscripted audio scenes boundaries according to an embodiment of the invention.

As shown on FIG. 5, we can determine 510 the semantic difference $Diff_{semantic}$ 530 for a window $t_b$ before the time instant $t_0$ and a window $t_a$ after the time $t_0$ as $$Diff_{semantic} = \frac{1}{2}\sum_{i=1}^{M} \frac{[T_a(i, j) - T_b(i, j)]^2}{T(i, j) + T(i, j)},$$

where $T_a(i, j)$ and $T_b(i, j)$ are the transition matrices for windows $t_a$ and $t_b$. If $Diff_{semantic}$ is greater than a threshold $Th_2$ 550, and also a local maximum 560, then the time $t_0$ indicates a boundary 350.

Detecting Markers

The marker is a single label m of the class that occurs throughout the video at a moderate frequency, neither too high nor too low. The marker can be determined from either the transition matrix or the histogram for the entire content. Therefore, the marker satisfies the following frequency constraint, $Fr_{low} < T(m,j) < Fr_{high}$, where $Fr_{low}$ is a low frequency threshold, and $Fr_{high}$ is a high frequency threshold. If the label is relatively frequently occurring, then the corresponding class is probably an integral part of the audio content and cannot be effective as a marker. Similarly, if the label occurs relatively infrequently, it also cannot be effective as a marker. In one embodiment, $Fr_{high}$ is about one in three, and $Fr_{low}$ is about one in a hundred.

As an additional requirement, the label m associated with the marker should be moderately dispersed throughout the video. That is to say, the markers should not all be clumped together around a very small number of time instances. Similarly, the markers should also not be spread out so much that they occur at a large number of separated time instances. This constraint can be expressed as $$\alpha_1 \sum_{i \neq j} T(i, j) > T(m, m) > \alpha_2 \sum_{i \neq j} T(i, j), \text{ where } \sum_{i \neq j} T(i, j)$$

counts all transitions non self transitions, i.e., $i \neq j$, $T(m, m)$ counts self transitions for the marker label, $\alpha_1$ is maximum dispersion coefficient, and $\alpha_2$ is minimum dispersion coefficient. In one embodiment, we select $\alpha_1 = 5.0$, and $\alpha_2 = 1.5$.

Figure 6:
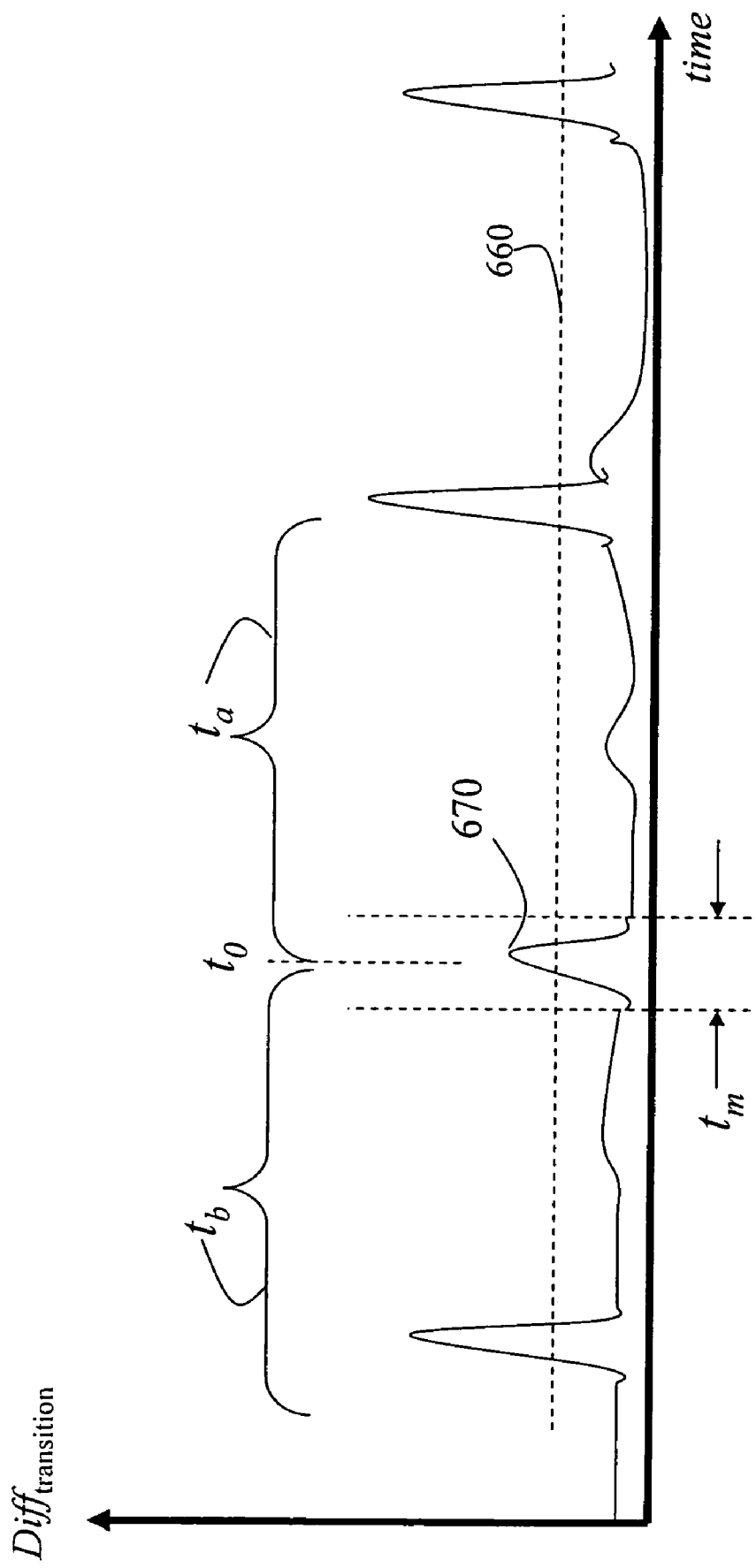
FIG. 6 is a timing diagram of scripted audio scenes boundaries according to an embodiment of the invention.

After determining a marker m, we can determine a transition matrix $T_m$ for a time period $t_m$, associated with the marker, see FIG. 6. In one embodiment, $t_m$ is 0.5 second.

In one embodiment, the markers can be used as approximate boundaries. A more accurate estimate of the boundaries can be obtained by measuring the transition difference for the time spans $t_b$ before the current time instant $t_0$ and for the time spans $t_a$ after the timer $t_0$ for time span $t_c$:

$$Diff_{transition} = \frac{T_m(i_m, j) \times t_m}{T_b(i_m, j) \times t_b + T_a(i_m, j) \times t_a},$$

where $T_a$, $T_b$, and $T_m$ are the transition matrices for time periods $t_a$, $t_b$, and $t_m$, respectively. When $Diff_{transition}$ is greater than the threshold $Th_1$, and also is a local maximum, the corresponding time $t_0$ is a boundary. Essentially, this attempts to locate the center of a clump of markers that are substantially temporally adjacent.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for segmenting a video, in which the video includes video content and audio content, and the video content and the audio content are synchronized, comprising the steps of:

classifying each frame of audio content of a video with a label to generate a sequence of consecutive labels;

assigning a dominant label to each successive time interval of consecutive labels, in which a length of the time interval is substantially longer than a length of the frame;

constructing a semantic description for sliding time windows of the successive time intervals, in which the sliding time windows overlap in time and a length of each time window is substantially longer then the length of the time interval, and the semantic description for each time window is a transition matrix determined from transitions between the successive dominant labels of the time intervals;

determining a marker from the transition matrices, wherein the marker is a single label of a class that occurs throughout the video, in which a frequency of occurrence of the marker is between a low frequency threshold and a high frequency threshold, and wherein a frequency of occurrence of the marker for the low frequency threshold is about one in a hundred labels, and the frequency of occurrence of the marker for the high frequency threshold is about one in three labels; and segmenting the video at the locations of the markers in the audio content.

2. The method of claim 1, further comprising:
constructing the transition matrix for the audio content of the entire video.

3. The method of claim 1, further comprising:
constructing a histogram from each transition matrix.

4. The method of claim 3, further comprising:
constructing the histogram for the audio content of the entire video.

5. The method of claim 1, in which a number of transitions in the transition histogram of the entire video is equal to a number of labels in the audio content of the entire video.

6. The method of claim 5, in which the transitions include self-transitions between the successive dominant labels.

7. The method of claim 1, further comprising:
determining a transition difference at every time instant where the marker occurs in the video.

8. The method of claim 7, further comprising:
comparing the transition difference to a first threshold $Th_1$ to indicate a indicate a segmentation boundary in the video.

9. The method of claim 1, further comprising:
normalizing the transition matrices.

10. The method of claim 1, further comprising:
determining a semantic difference $Diff_{semantic}$ for each time window at time $t_b$ before a current time to of a current time window and each time window at a time $t_a$ after the current time $t_0$ as $$Diff_{semantic} = \frac{1}{2} \sum_{i=1}^{M} \frac{[T_a(i,j) - T_b(i,j)]^2}{T(i,j) + T(i,j)},$$

where $T_a(i,j)$ and $T_b(i,j)$ are the transition matrices for the time windows at time $t_a$ and time $t_b$;

comparing $Diff_{semantic}$ to a second threshold $Th_2$ to indicate a segmentation boundary in the video.

11. The method of claim 1, in which the segmenting further comprises:
determining a transition difference $Diff_{transition}$ for a time spans $t_b$ before a current time instant $t_0$ and for a time spans $t_a$ after the time $t_0$ for time span $t_m$ associated with the marker according to $$Diff_{transition} = \frac{Tm(i_m, j) \times t_m}{T_b(i_m, j) \times t_b + T_a(i_m, j) \times t_a},$$

where $i_m$ is the marker, $T_a$, $T_b$, and $T_m$ are the transition matrices for the time periods $t_a$, $t_b$, and $t_m$, respectively;

comparing the transition difference with threshold; and selecting a current time as a boundary when the transition difference is greater than threshold and is a local maximum.

12. The method of claim 1, in which the marker is moderately dispersed throughout the video.

* * * * *